(12) United States Patent
Deutschmann et al.

(10) Patent No.: US 10,437,971 B2
(45) Date of Patent: Oct. 8, 2019

(54) SECURE AUTHENTICATION OF A USER OF A DEVICE DURING A SESSION WITH A CONNECTED SERVER

(71) Applicants: Ingo Deutschmann, Merseburg (DE); Neil Costigan, Lulea (SE); Tony Libell, Lulea (SE)

(72) Inventors: Ingo Deutschmann, Merseburg (DE); Neil Costigan, Lulea (SE); Tony Libell, Lulea (SE)

(73) Assignee: BEHAVIOSEC INC., San Francisco, CA (US)

( * ) Notice: Subject to any disclaimer, the term of this patent is extended or adjusted under 35 U.S.C. 154(b) by 0 days.

(21) Appl. No.: 16/115,701

(22) Filed: Aug. 29, 2018

(65) Prior Publication Data
US 2018/0365399 A1 Dec. 20, 2018

Related U.S. Application Data

(63) Continuation-in-part of application No. 15/073,743, filed on Mar. 18, 2016, now Pat. No. 10,075,437,
(Continued)

(51) Int. Cl.
*G06F 21/31* (2013.01)
*H04L 29/06* (2006.01)
(Continued)

(52) U.S. Cl.
CPC .......... *G06F 21/316* (2013.01); *H04L 9/3242* (2013.01); *H04L 9/3271* (2013.01);
(Continued)

(58) Field of Classification Search
CPC .............. H04L 63/0861; H04L 63/0853; H04L 9/3231; H04L 9/3271; H04L 63/08;
(Continued)

(56) References Cited

U.S. PATENT DOCUMENTS 9,122,390 B2   9/2015 Costigan et al.
9,237,143 B1 * 1/2016 Dotan ...................... H04L 63/08
(Continued)

OTHER PUBLICATIONS

Zighra, Adaptive Behavioral Authentication In The Enterprise (Nov. 2015) (Year: 2015).*
(Continued)

*Primary Examiner* — Theodore C Parsons
(74) *Attorney, Agent, or Firm* — Michael J. Feigin, Esq.; Feigin & Fridman LLC.

(57) ABSTRACT

Method for a secure authenticating of a user identity of a device for a service during a session including a transaction between an authentication-client and a connected authentication-server, whereby said authentication-client is running on said device using a user-agent with a specific authentication-interface to communicate encrypted authentication messages using a Transport Layer Security (TLS) protocol between said user-agent of said authentication-client and a web-server of both said authentication-server of a 'Relying Party' using a unique and secret authentication-identifier (e.g. a hash-value created from 'Relying Party', date and time) between them, and a Behaviometric-server using a unique and secret Behaviometric-identifier (e.g. a hash-value created from a Behaviometric-Server, date and time) between them, whereby said session comprising an earlier authentication stage and at least in authentication case (said user identity is positively authenticated) a later controlling stage. Also a related computer program algorithm and a computer-system executing this.

19 Claims, 2 Drawing Sheets

Related U.S. Application Data which is a continuation-in-part of application No. 14/070,654, filed on Nov. 4, 2013, now Pat. No. 9,301,140.

(60) Provisional application No. 61/722,804, filed on Nov. 6, 2012.

(51) Int. Cl.

| | | |
|---|---|---|
| *H04W 12/06* | (2009.01) | |
| *H04L 29/08* | (2006.01) | |
| *H04W 12/00* | (2009.01) | |
| *H04L 9/32* | (2006.01) | |

(52) U.S. Cl.
CPC ........ *H04L 63/083* (2013.01); *H04L 63/0876* (2013.01); *H04L 63/0884* (2013.01); *H04L 63/102* (2013.01); *H04L 63/166* (2013.01); *H04L 63/168* (2013.01); *H04L 67/22* (2013.01); *H04L 67/306* (2013.01); *H04W 12/00503* (2019.01); *H04W 12/00508* (2019.01); *H04W 12/06* (2013.01); *H04W 12/0605* (2019.01); *G06F 2221/2133* (2013.01); *G06F 2221/2139* (2013.01); *H04L 63/0428* (2013.01)

(58) Field of Classification Search
CPC ... H04L 9/30; H04L 9/14; H04L 63/06; H04L 67/42; H04L 9/3242; G06F 21/316; G06F 21/34; G06F 21/32
See application file for complete search history.

(56) References Cited

U.S. PATENT DOCUMENTS

| | | | |
|---|---|---|---|
| 9,298,912 | B2 | 3/2016 | Costigan et al. |
| 9,301,140 | B1 | 3/2016 | Costigan et al. |
| 9,529,987 | B2 | 12/2016 | Deutschmann et al. |
| 9,531,710 | B2 | 12/2016 | Deutschmann et al. |
| 9,935,953 | B1 | 4/2018 | Costigan et al. |
| 10,068,076 | B1 | 9/2018 | Deutschmann et al. |
| 10,068,088 | B2 | 9/2018 | Costigan et al. |
| 10,075,437 | B1 | 9/2018 | Costigan et al. |
| 2011/0126024 | A1* | 5/2011 | Beatson ............. G06F 21/32 713/186 |
| 2012/0198491 | A1* | 8/2012 | O'Connell ......... G06F 21/316 725/30 |
| 2014/0047527 | A1* | 2/2014 | Ngo ................. H04L 63/08 726/7 |
| 2014/0333524 | A1* | 11/2014 | Liu .................. G06F 3/017 345/156 |
| 2016/0021081 | A1* | 1/2016 | Caceres ............. H04L 63/08 726/7 |
| 2016/0253486 | A1* | 9/2016 | Sarkar ............. G06F 21/316 726/7 |
| 2016/0253490 | A1* | 9/2016 | Hong .............. G06F 21/316 726/7 |
| 2016/0269403 | A1* | 9/2016 | Koutenaei ......... H04L 63/0861 |
| 2016/0283865 | A1 | 9/2016 | Costigan et al. |
| 2017/0230363 | A1 | 8/2017 | Deutschmann et al. |

OTHER PUBLICATIONS

FIDO UAF Protocol Specification v1-0 (Dec. 8, 2014) (Year: 2014).*
FIDO UAF Architectural Overview (Dec. 8, 2014) (Year: 2014).*
FIDO-UAF-Complete-v1.0-id-20141122 (Year: 2014).*

\* cited by examiner

SECURE AUTHENTICATION OF A USER OF A DEVICE DURING A SESSION WITH A CONNECTED SERVER

BACKGROUND OF THE INVENTION

An 'authentication-client' and a connected 'authentication-server' are parts of a general, wired or non-wired, digital infrastructure for authentication services, which is used for example in banking applications. Authentication services which fulfill the Universal 2nd Factor (U2F) are also digital authentication services using similar infrastructure, but are more specific and typically stronger. U2F is an open authentication standard that strengthens and simplifies two-factor authentication (2FA)—and especially the FIDO-standard.

U.S. patent application publication no. US2016/15048021 filed on Feb. 19, 2016, incorporated herein by reference.

Accordingly, it is an object of the present invention to provide an improved system for online authentication of the identity of a user using a device and seeking access to online services and websites, whether on the open Internet or within enterprises.

SUMMARY OF THE INVENTION

The present disclosure relates to a method, a computer program algorithm, and a computer product/system for executing the method and algorithm. The present invention overcomes the deficiencies discussed hereinabove by providing a method for secure authentication to a service and control of a user identity of a device while reducing the need to create and remember many online credentials.

In accordance with an aspect of some embodiments of the disclosed technology, there is provided a method for securely authenticating a user to a service for executing a transaction, the method being carried out in a system including:
  a user device operated by the user, the user device including an authentication-client using a user-agent with a specific authentication-interface for encrypted communication of authentication messages;
  an authentication server of a relying party providing the service;
  a behaviometric server in communication with the user agent of the user device and with the authentication server using an authentication identifier; and
  a web-server associated with the relying party, the web-server being in communication with the authentication server, the aSuthentication client, and the behaviometric server,
the method including:
  a. in an authentication stage:
    upon user initiation of the session by establishing a TLS-connection between the user-agent and the web-server of the relying party, at the web server, generating a unique session identifier;
    attempting to authenticate the user device to the service; and
      if the attempting to authenticate fails, rejecting access of the user device to the service; or
      if the attempting to authenticate succeeds, flagging said user device as being authenticated; and
  b. in a controlling stage:
    collecting behavioral data from at least one user input component of the user device during the session with the session-identifier by a background process and storing the collected behavioral data on a non-transitory storage medium housed in the user device;
    transmitting at least a portion of the stored behavioral data from the user device to the web-server, which conveys a Behavioral-identifier and at least a portion of the stored behavioral data to the behaviometric-server;
    at the behaviometric server, and based on at least the portion of the stored behavioral data, determining whether an identity of the user is still valid; and
    if the user identity is determined to no longer be valid, carrying out at least one of closing the session or raising an alert by the behaviometric-server, and transmitting the alert to the web-server of the relying party.

In some embodiments, the controlling stage is performed periodically.

In some embodiments, collecting the behavioral data, storing the collected behavioral data, and transmitting at least a portion of the stored behavioral data to the behaviometric-server are carried out continuously.

In some embodiments, determining whether an identity of the user is still valid includes checking whether at least the portion of the stored behavioral data displays bot-program-characteristics.

In some embodiments, determining whether at an identity of the user is still valid includes checking whether at least the portion of the stored behavioral data displays remote-access characteristics.

In some embodiments, determining whether an identity of the user is still valid includes comparing at least the portion of the stored behavioral data to stored user-specific behavioral data of the user collected during prior use of the service of the relying party by the user. In some such embodiments, determining whether an identity of the user is still valid includes, if the at least the portion of the stored behavioral data does not match the stored user-specific behavioral data, indicating fraudulent access to the service.

In some embodiments, the authentication-client is a FIDO client, the authentication-server is a FIDO-server, and attempting to authenticate the user device includes carrying out an authentication process that fulfills the FIDO standard.

In some embodiments, the behaviometric server includes a decryption server, and the transmitting comprises transmitting the at least a portion of the behavioral data when the data is encrypted.

In some embodiments, attempting to authenticate includes, sending, from the behaviometric-server to the authentication-server, a message including at least one of a 'Transaction Text' or a 'Challenge' signed or encrypted by at least one of a Message Authentication Code (MAC) or a behaviometric-server-certificate, and, at the authentication server, generating an 'Authentification Request' message including at least one of the 'Transaction Text' or the 'Challenge'.

In some embodiments, collecting the behavioral data includes sending an input form, requiring the user to enter a text string, from the web server to the user device, to catch more behavior from the user.

In some embodiments, attempting to authenticate includes requesting the user to provided a PIN related to user.

In some embodiments, transmitting includes sending at least one of additional user information or transactional data from the user device to the behavioral server, together with the at least a portion of the behavioral data.

In some embodiments, attempting to authenticate includes:

transmitting an 'Initiate Transaction' message including said authentication-identifier and transactional information and at least some behavioral data from the authentication client, via the TLS-connection, to the web-server; and conveying the 'Initiate Transaction' message from the web server to the behaviometric-server.

In some embodiments, the behaviometric-server forms part of the authentication-server or a protected area of the relying party.

In some embodiments, the behaviometric-server is located outside of the authentication-server and of a protected area of the relying party.

In some embodiments, the behavioral data includes at least one of touch gestures, keyboard actions, data captured from a gyrostatic sensor, an accelerometer, or a Global Positioning System during movement of the user device, keystroke patterns, keystroke style, use of particular applications, and speech recognition.

In some embodiments, the user device is a mobile computing device.

In some embodiments, the attempting to authenticate includes:

capturing device-information of the user device;

transmitting the captured device-information to the behaviometric-server;

storing the device-information in the behaviometric server as data related to the at least some behavioral data; and in a subsequent authentication stage, following an initial rejection of the user identity, selecting the at least some behavioral data dependent on the device-information.

In some embodiments, the method further includes, if the attempting to authenticate fails multiple times, prohibiting the transaction requested by the user.

In some embodiments, there is provided a computer program algorithm executing the method disclosed herein, and a computer system executing such an algorithm.

DETAILED DESCRIPTION

Figure 1:
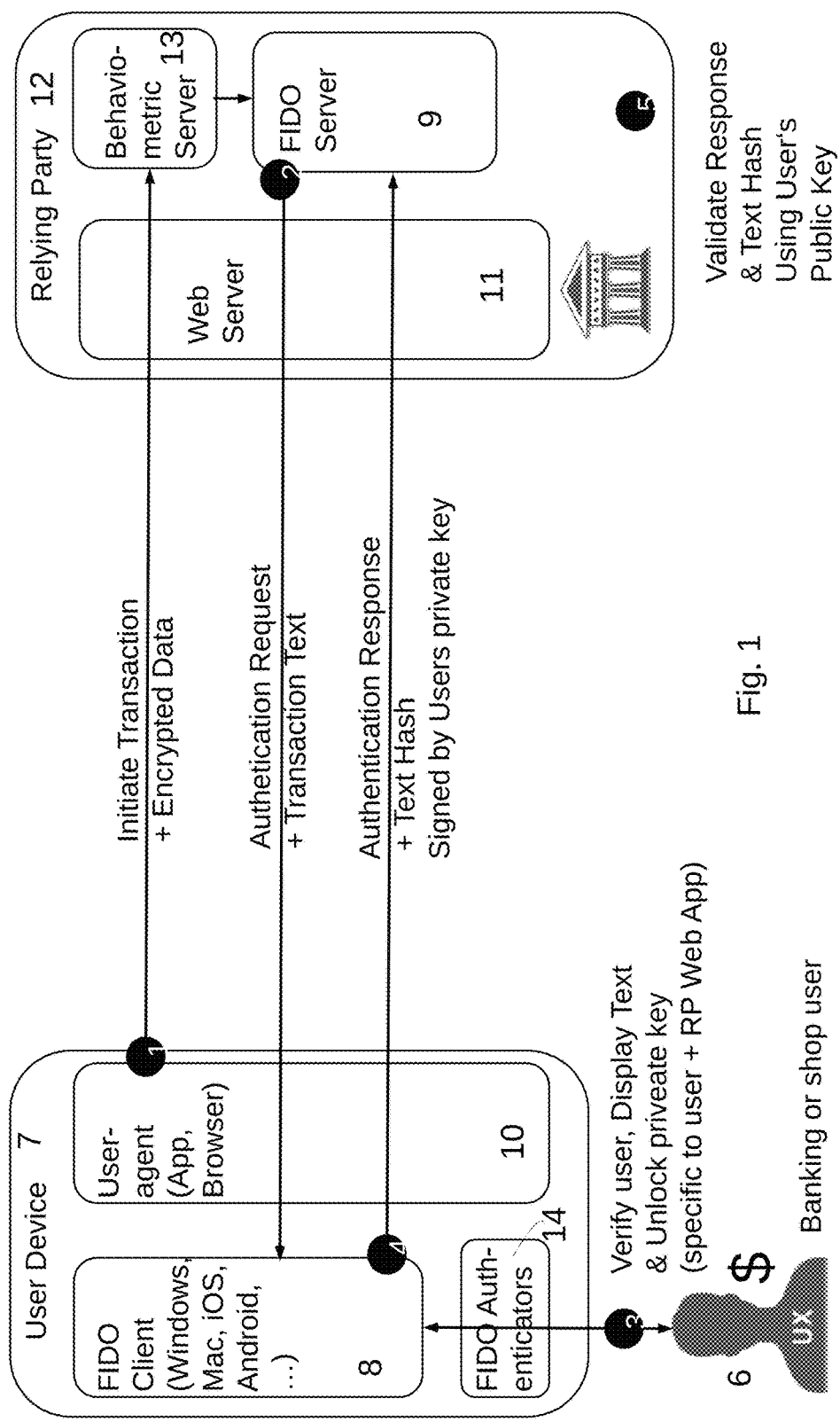
FIG. 1 shows a schematic illustration of a computer system useful for securely authenticating a user in a FIDO-like manner.
Figure 2:
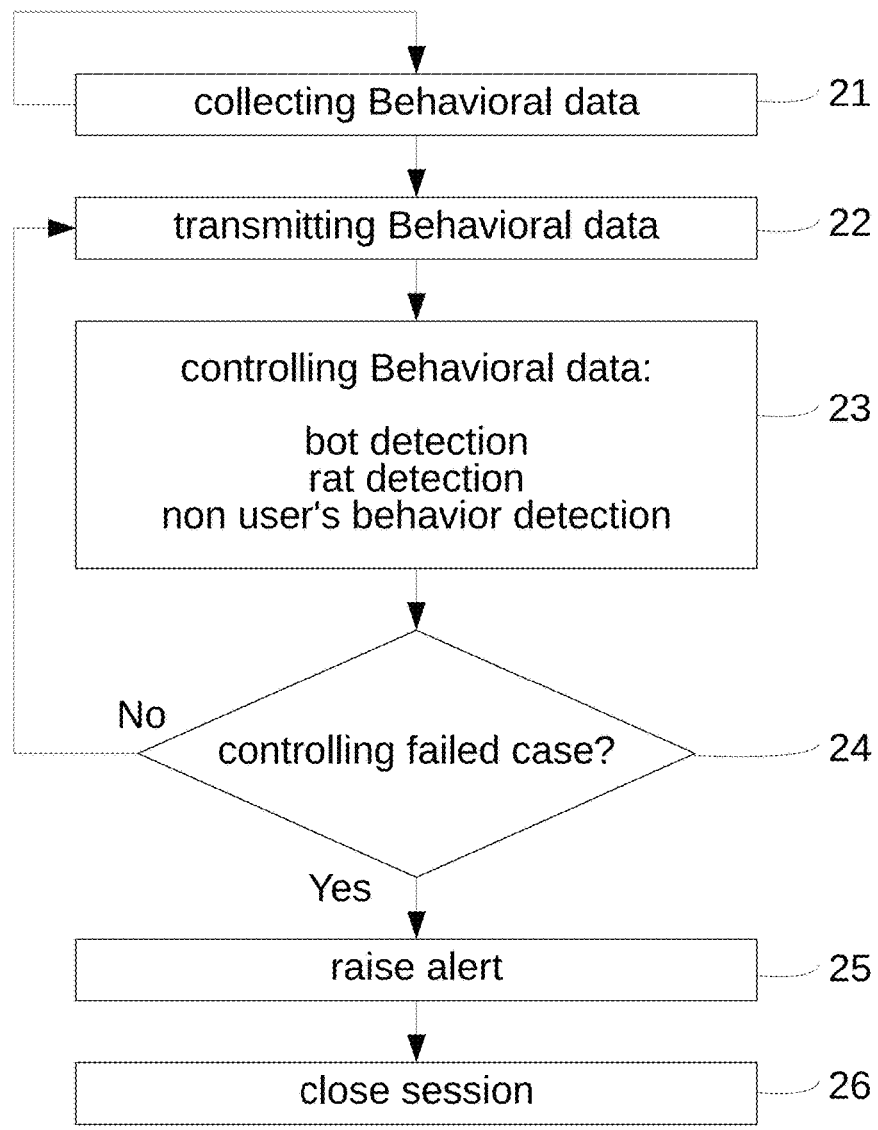
FIG. 2 shows a flow chart of steps taken in a method of an embodiment of the disclosed technology.

Reference is now made to FIG. 1, which is a schematic illustration of a computer system useful for securely authenticating a user identity in a FIDO-like manner, and to FIG. 2, which is a flow chart of steps taken in a method of an embodiment of the disclosed technology.

The technology described herein includes systems, program-products such as a disk-on-key stick and the like, and methods for securely authenticating a user identity of a user device for a service during a session. The technology also relates to authenticating a user identity of a user device during a session with a connected server in a FIDO-'Confirmation Message Flow' like manner.

As seen in FIG. 1, the systems, program-products and methods are used for verification and authentication of the identity of a user 6 to software services, such as social platforms, databases, banking accounts, and/or services controlling interfaces of computers and machines, but may also be used with respect to general usage of computers.

FIGS. 1 and 2 relate to a system and a method for securely authenticating the identity of user 6 of a user device 7 to a service, for which user 6 pays money $, during a session including a transaction between an authentication-client in the form of a FIDO-client 8 and a connected authentication-server in the form of a FIDO-server 9. The authentication server 9 is functionally associate to a user 6 and profiled with a behaviometric server 13 and a web server 11, authentication server 9, behaviometric server 13, and web server 11 may all form part of a 'Relying Party' 12.

The user device 7 may be any suitable user device, such as a desktop computer, a laptop computer, or a mobile computing device, e.g. a tablet or smart-phone. The authentication-client or FIDO-client 8 runs on user device 7 using a user-agent 10, which may be, for example, a mobile app when the user device 7 is a smartphone, or a browser when the user device 7 is a desktop or laptop computer. The user-agent 10 may have a specific authentication-interface to communicate encrypted authentication messages between the user-agent 10 of the authentication-client 8 and web-server 11 of the 'Relying Party' 12 using a unique and secret authentication-identifier, and using a suitable communication protocol, such as the Transport Layer Security (TLS) communication protocol. The authentication-identifier may be created by a hash-value created by 'Relying Party' 12, as well as the current date and time. The specific authentication-interface may also be used to communicate encrypted authentication messages between the user-agent 10 of the authentication-client 8 and behaviometric-server 13 using a unique and secret behaviometric-identifier, such as a hash-value created by the behaviometric-server, as well as the current date and time. In cases in which the user device 7 is a laptop or desktop, the specific authentication interface may be in the form of an authentication-specific browser plugin using a browser plugin interface. In cases in which the user device 7 is a mobile phone or tablet, the specific authentication interface may be a mobile app using an authentication-specific Software Development Kit (SDK), The specific authentication-interface enables the use of authenticator-based cryptographic services for authentication-supported operations, which operations are supported by a registered authentication-authenticator containing the private key of user 6 and the corresponding public key as a key pair, which may be located at user device 7. The user-agent 10 sends additional user information and/or transactional data, together with behavioral data of the user 6, to the behaviometric-server 13.

An authentication session includes an initial authentication stage, and, when the user profile is trained enough and an authentication is reached and the identity of user 6 is positively authenticated, a subsequent controlling stage. In the authentication stage, the session starts with a unique session-identifier provided by web-server 11 of the 'Relying Party' when user 6 establishes a TLS-connection of user-agent 10 of user device 7 to web-server 11 of 'Relying Party' 12. In the case of positive authentication, web server 11 flags the communication as enabling access sought by the user 6. Otherwise, access is rejected.

The controlling stage is performed periodically. In the controlling stage, behavioral data collected from an input component of user device 7, such as Keyboard, mouse, accelerometer, and the like, is stored on a non-transitory storage medium housed within the device 7. The behavioral data collected during the current session using the current session-identifier may be collected by a background process, and is referred to as the behavioral-identifier, associated with the current session-identifier. Subsequently, stored behavioral data from a previous session are transmitted to web-server 11, which conveys the behavioral-identifier and the received behavioral data to the behaviometric-server 13. The controlling module uses the behavioral data as well as an additional data-set and several methods in a fuzzy manner to evaluate whether the user 6 exhibits human-like behavior or machine-like behavior, for example as described in U.S. Patent Application Publication Number 2016/15048021, which is hereby incorporated by reference as if fully set forth herein.

In the controlling stage, which is executed after the authentication stage, the behavioral data from user 6 are continuously captured, for example in a hidden manner or using a background process. The captured behavioral data is stored and transmitted to behaviometric-server 13. As such, the controlling stage may also function as a preparation stage for the specific behavior user 6 as registered or controlled by behaviometric-server 13, for a later date at which the same user identity seeks access to the same service. In a first portion of the authentication stage device-information of the user device 7 is captured, transmitted to behaviometric-server 13, and stored in the behaviometric server as data related to the received behavioral data, additional user information and transactional data. If the data is rejected by a second, later portion of the authentication stage, part of stored data is selected depending on the device-information. For problematic cases with a rejection of the identity of user 6 in the authentication stage, the necessity of clarity and definiteness of determining is strength in a secondary authentication stage. If the identity of user 6 is rejected multiple times, the transaction requested by the user is prohibited.

Based on the behavioral data received during the authentication stage, the behaviometric-server 13 uses a controlling module to determine whether the user identity, previously flagged as authenticated, is still valid by comparing newly captured behavior with the stored behavioral data. If, during the controlling stage, the user identity is determined to be invalid, the session is closed. In this case, an alert is raised by the behaviometric-server 13 and transmitted to the web-server 11 of the 'Relying Party' 12. The controlling module checks the behavioral data against non-human like bot-program-characteristics, such as detecting whether an instantaneous, or too fast, filling of an input-string. Additionally, the controlling module checks the behavioral data against remote-access-characteristics, such as whether characteristic timing data are detected. Characteristic timing data may include timing of keystrokes, mouse-, swipe-, accelerometer-sensor- and gyrostatic-sensor-input, which enable detection of remote access by a guard-application on the server side. Additionally, the controlling module checks the behavioral data against user-specific behavioral data of user 6 collected during a previous usage session of this service of 'Relying Party' 12 by user 6 and stored in a connected external database. To detect fraudulent access by a remote access tool or bot, the controlling module compares the received behavioral data to the stored profile of the behavior of user 6. The controlling module determines whether a delta exists between the received behavioral data and the stored profile, and if a sufficiently large delta exists, the controlling module raises flag indicative of fraudulent access.

The web-server 11 may also send to user 6 an input form containing a text string (e.g. captcha), which user 6 has to enter, in order to capture more behavioral data of the user 6. A request 3 for user-action, illustrated in FIG. 1, includes a request for a PIN related to user 6 and the $ symbol in FIG. 1 indicates the service of the bank. Behavioral data is captured from user 6 when the user 6 uses a banking application or a banking website. The behavior of user 6 is captured when entering credentials like username/passwords or transactional data like beneficiary, account numbers or other banking related data, or even when entering credit card data in a shop environment. Every interaction of user 6 with the user device 7 can be used to capture his behavior together with the transaction.

For each interaction or specific set of interactions of the user 6 with one or more input components of the user device 7, such as a mouse, keyboard, touch-pad, sensor-pen and the like, behavioral data is collected from the input component (s). Additional sensor data may also be collected, for example from one or more sensors of the user device 7, such as an accelerometer, a gyroscope, a magnetometer, pressure-sensors and other sensors. The collected data are stored, and may later be used by behavioral authentication methods, for example as described in US application nos. 201313866183, 201313866190, 201314070654, 201514705321, 201514705478, 201615048021, 201615073743, 201615182682, 201615178676, 201615343616, 201715581588, 2015830104. The Behavioral data may include touch gestures, data relating to keyboard actions (dwell, flight time), data relating to movements of user device 7 by capturing data from a gyrostatic or accelerometer sensor, as well as GPS-coordinates. The behavioral data may further include electronic input observations such as keystroke patterns and style, use of particular applications, and speech recognition.

To realize authentication of the identity of user 6 during a session of authentication-client 8 of user device 7 with authentication-server 9, in order to conduct a secure transaction in a FIDO-like manner, both the authentication-server 9 and the authentication-client 8 have to fulfill some special requirements specified in the FIDO and UAF protocols.

As seen in FIG. 1, which is a schematic illustration of a computer system for secure authentication of the identity of a user 6 of a mobile device 7, which is illustrated as a smart-phone. The mobile device 7 includes a FIDO-client 8, such as a FIDO-UAF-client, in communication with a FIDO-server 9, such as a FIDO-UAF-server. FIG. 2 further illustrates a method for authentication of the identity of user 6 using a FIDO-UAF-'Confirmation Message Flow' which takes place during a session for a transaction in a FIDO-UAF-like manner.

The FIDO-client 8 runs on the user device 7 using a user-agent 10, such as a mobile app and/or browser, with a specific FIDO-interface, such as a FIDO-specific browser plugin using a browser plugin interface or a mobile app using a FIDO-specific SDK, to communicate encrypted FIDO UAF messages between the user-agent 10 of the FIDO-client 8 and a web-server 11, using a TLS-protocol. The web-server 11 is associated with the FIDO-server 9, which is associated with a 'Relying Party' 12 illustrated as a bank, and with a behaviometric-server 13. The FIDO-server 9 and the behaviometric-server 13 use a unique and secret FIDO-identifier, such as a hash-value created by the Relying Party, as well as the current date and time for communication with the user device 7. The user-agent 10 additionally sends encrypted data to a decryption-server forming part of behaviometric-server 13. The specific FIDO-interface of user agent 10 enables the use of authenticator-based cryptographic services for FIDO-supported operations, which are supported by a registered FIDO-authenticator 14 based on a private key associated with the user, and a related public key, which are used as a key pair located at device 7.

The authentication also fulfills the FIDO standard and the user-agent is sending data encrypted to a Decryption-server as part of the Behaviometric-server 13. The Behaviometric-server 13 is sending a 'Transaction Text' respectively a 'Challenge' signed/encrypted by Message Authentication Code (MAC) and/or a Behaviometric-server-Certificate to the FIDO-server 9 for generation of the 'Authentification Request'. The transmission 3 from Behaviometric-server 13 to FIDO-server 9 includes the 'Transaction Text', or 'Challenge', signed or encrypted by MAC and/or by a Behaviometric-server-Certificate for generation of the 'Authentification Request' 2. FIDO-client 8 can decrypt the transmission and check the MAC and/or the signature of Behaviometric-server 13 by using a symmetric key included in the transmission, and/or by using an a public key and/or a certificate of Behaviometric-server 13 included in the transmission. FIDO-client 8 transmits the 'Initiate Transaction' message 1 including the FIDO-identifier, transactional information, and at least a portion of the stored Behavioral data to web-server 11, via the TLS connection. Web server 11 then conveys the 'Initiate Transaction' message 1, together with the FIDO-identifier, the transactional information and the portion of the stored Behavioral data to the Behaviometric-server 13.

As shown in FIG. 1, behaviometric server 13 is located inside the protected area of 'Relying Party' 12. However, as well be understood by a person skilled in the art, behaviometric-server 13 may also be located outside of the protected area of 'Relying Party' 12, and may be anywhere, such as in a cloud based on the Internet. Behaviometric-server 13 is connected to a profile-database (not explicitly shown) containing behavioral data including behavioral profiles of users. A unique FIDO-identifier-profile is created and stored in the profile-database by behaviometric-server 13, such that behavioral data collected during a registration-session of a new FIDO-identifier for access to the service sought by user 6, is added to the suitable profile in the profile database, or to a new profile. The registration session includes the creation of the user's key-pair with the user's attestation private key at user device 7 and creation of an attestation using the user's attestation public key of the user's public key, which is transmitted by FIDO-client 8 to FIDO-server 9, which is stored at a 'Cryptographic authentication key reference DB' (not explicitly shown) at the 'Relying Party' 12. FIDO-server 9 creates a 'Registration Request' and a 'Policy' to perform a connection-oriented communication between FIDO-client 8 and FIDO-server 9 during the span required for the transaction, the communication enabling privileged access sought by user 6 for the transaction and received by FIDO-client 8, whereby the FIDO-identifier is related to the collected behavioral data. Also, a unique user-profile is created and stored in the profile-database by behaviometric-server 13 and collected behavioral data is added during the registration-session if new personal data of user 6 becomes available.

As mentioned above, an authentication session according to the disclosed technology, includes an authentication stage, in which a user is flagged as authenticated, and a subsequent controlling stage, which may also function as a preparation stage for a further session of the same user for the same service at a later time.

In some embodiments of the disclosed technology, in the authentication stage, of the steps listed below are carried out:
a) Upon initiation of the session, when user 6 establishes a TLS-connection between user-agent 10 and web-server 11 of 'Relying Party' 12. The web-server 11 then generates a unique session-identifier for the session, conveys the unique session-identifier to the behaviometric-server 13, which then generates a unique and secret behaviometric-identifier and conveys this behaviometric-identifier to the web-server 11.
b) FIDO client 8 transmits to web-server 11, via the initiated TLS-connection, an 'Initiate Transaction' message, illustrated in FIG. 1 as message 1;
c) The 'Initiate Transaction' message 1, including the FIDO-identifier, is transmitted from web-server 11 to FIDO-server 9;
d) FIDO-server 9, generates an 'Authentication Request' message 2 using the received FIDO-identifier, and in some cases also generating an accompanying 'Transaction Text' and corresponding 'Text-Hash'. The 'Transaction Text' and corresponding 'Text Hash' form a 'Challenge' and a 'Policy'. The generated 'Authentication Request' message 2 is then transmitted to FIDO-client 8;
e) FIDO-client 8 receives 'Authentication Request' message 2 from FIDO-server 9, and in response, provides to the user 6 a request 3 for a user-action. The request for user action may ask the user to sign the 'Text-Hash' or the 'Challenge' with a unique private key of an asymmetric key-pair of user 6 stored at the user device 7;
f) FIDO-client 8 generates an 'Authentication Response' message 4 responding to the 'Authentication Request' message 2 and including the 'Text-Hash', or 'Challenge', signed with the private key. The 'authentication response' message 4 is transmitted to FIDO-server 9;
g) If the signed 'Text-Hash', or 'Challenge', is positively validated by FIDO-server 9 using a public key located at the 'Relying Party' 12, which public key forms part of the key-pair of user 6, the transaction requested by user 6 is executed. Otherwise, if the signed 'Text-Hash' or 'Challenge' is not positively validated, web server 11 moves into the controlling stage, under the assumption that authentication has failed.
h) Following execution of the transaction requested by user 6, the web server 11 flags the user 6, or the user device 7, as an authenticated user, and the flag and the session-identifier are transmitted by the web-server 11 to the behaviometric-server 13.

An embodiment of the controlling stage of the session, which occurs subsequent to the authentication stage, is illustrated in the flow chart of FIG. 2. Typically, at least three, at least four, at least five, or all the steps listed below are carried out:
i) At step 21 of FIG. 2, following a request by the web-server 11, user agent 10 continuously collects behavioral data from at least one user input component of user device 7 during the current session while using the session-identifier, typically in a background process. The collected behavioral data is stored on a non-transitory storage medium, which may, in some embodiments, be housed within device 7;
j) At step 22, following a request by the web-server 11, the stored behavioral data related to the current session-identifier is transmitted from user-agent 10, via web-server 11, to behaviometric-server 13, and is stored as data related to the current behaviometric-identifier;
k) At step 23, if the user identity, which was flagged as authenticated, is still valid, behaviometric-server 13 periodically performs control operations on the received behavioral data using a controlling module; the controlling module executes the following control operations, typically each in an independent thread:
1) the controlling module whether the received behavioral data displays non-human like, or bot-program, characteristics. For example, the controlling module may check whether filling of an input-string was instantaneous, or too fast. Detection of such non-human like or bot-program characteristics results in failure of the controlling check, and lack of such detection results in reinforcing the authentication of the identity of user 6 identity;

2) the controlling module checks whether the behavioral data displays remote-access characteristics. For example, the controlling module may check whether the timing data is characteristic to remote access. Detection of such remote access characteristics results in failure of the controlling check, and lack of such detection results in reinforcing the authentication of the identity of user 6;

3) the controlling module compares the behavioral data, entered during the preparation stage of the session, to stored user-specific behavioral data associated with user 6, which stored data was collected during prior use of the service of 'Relying Party' 12 by user 6 using a second FIDO-identifier; A lack of matching between the compared behavioral data sets results in failure of the controlling check, and similarity or matching between the data sets results in reinforcing the authentication of the identity of user 6.

l) The operations carried out by the controlling module are reviewed at step 24, and are evaluated to see whether there was a failure case. In some embodiments, a failure case occurs if there is a failure of a single controlling check. In other embodiments, a failure case occurs only if two of the checks carried out by the controlling module fail, or if all three of the checks carried out by the controlling module fail.

m) If a failure case has occurred, at step 25 an alert is raised by the behaviometric-Server 13 and transmitted to web-server 11 of 'Relying Party' 12, and the session is closed at step 26.

n) If no failure case occurred, the flow returns from step 24 to step 22, for periodic checking of the behavioral data by the controlling module.

Although the present invention was shown and described with references to the preferred embodiments, these are merely illustrative of the present invention and are not to be construed as a limitation thereof and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What claimed is:

1. A method for securely authenticating a user to a service for executing a transaction, the method being carried out in a system including:
    a user device operated by the user, the user device including an authentication-client using a user-agent with a specific authentication-interface for encrypted communication of authentication messages;
    an authentication server of a relying party providing the service;
    a behaviometric server in communication with the user agent of the user device and with the authentication server using an authentication identifier; and
    a web-server associated with the relying party, the web-server being in communication with the authentication server, the authentication client, and the behaviometric server,
the method comprising:
a, in an authentication stage:
    upon user initiation of the session by establishing a TLS-connection between the user-agent and the web-server of the relying party, at the web server, generating a unique session identifier;
    attempting to authenticate the user device to the service; and
        if said attempting to authenticate fails, rejecting access of the user device to the service; or
        if said attempting to authenticate succeeds, flagging said user device as being authenticated; and
b. in a controlling stage:
    collecting behavioral data from at least one user input component of the user device during said session with said session-identifier by a background process and storing said collected behavioral data on a non-transitory storage medium housed in the user device;
    transmitting at least a portion of said stored behavioral data from the user device to the web-server, which conveys a Behavioral-identifier and at least a portion of said stored behavioral data to the behaviometric-server;
    at said behaviometric server, and based on at least said portion of said stored behavioral data, determining whether an identity of the user is still valid; and
    if the user identity is determined to no longer be valid, carrying out at least one of closing the session or raising an alert by the behaviometric-server, and transmitting said alert to the web-server of the relying party.

2. The method of claim 1, wherein said controlling stage is performed periodically.

3. The method of claim 1, wherein said collecting said behavioral data, said storing said collected behavioral data, and said transmitting at least a portion of said stored behavioral data to the behaviometric-server are carried out continuously.

4. The method of claim 1, wherein said determining whether an identity of the user is still valid includes checking whether at least said portion of said stored behavioral data displays bot-program-characteristics.

5. The method of claim 1, wherein said determining whether at an identity of the user is still valid includes checking whether at least said portion of said stored behavioral data displays remote-access characteristics.

6. The method of claim 1, wherein said determining whether an identity of the user is still valid includes comparing at least said portion of said stored behavioral data to stored user-specific behavioral data of the user collected during prior use of the service of the relying party by the user.

7. The method of claim 6, wherein said determining whether an identity of the user is still valid includes, if said at least said portion of said stored behavioral data does not match said stored user-specific behavioral data, indicating fraudulent access to the service.

8. The method of claim 1, wherein said the authentication-client is a FIDO client, the authentication-server is a FIDO-server, and said attempting to authenticate the user device includes carrying out an authentication process that fulfills the FIDO standard.

9. The method of claim 1, wherein the behaviometric server includes a decryption server, and wherein said transmitting comprises transmitting said at least a portion of said behavioral data when said data is encrypted.

10. The method of claim 1, wherein said attempting to authenticate includes, sending, from the behaviometric-server to the authentication-server, a message including at least one of a 'Transaction Text' or a 'Challenge' signed or encrypted by at least one of a Message Authentication Code (MAC) or a behaviometric-server-certificate, and, at the authentication server, generating an 'Authentification Request' message including said at least one of said 'Transaction Text' or said 'Challenge'.

11. The method of claim 1, wherein said collecting said behavioral data includes sending an input form requiring insertion of a text string from the web server to the user device.

12. The method of claim 1, wherein said attempting to authenticate includes requesting the user to provide a PIN related to user.

13. The method of claim 1, wherein said transmitting includes sending at least one of additional user information or transactional data from the user device to the behavioral server, together with said at least a portion of said behavioral data.

14. The method of claim 1, wherein said attempting to authenticate includes:
transmitting an 'Initiate Transaction' message including said authentication-identifier and transactional information and at least some behavioral data from the authentication client, via said TLS-connection, to the web-server; and
conveying said 'Initiate Transaction' message from the web server to the behaviometric-server.

15. The method of claim 1, wherein the behaviometric-server is located outside of the authentication-server and of a protected area of the relying party.

16. The method of claim 1, wherein said behavioral data includes at least one of touch gestures, keyboard actions, data captured from a gyrostatic sensor, an accelerometer, or a Global Positioning System during movement of the user device, keystroke patterns, keystroke style, use of particular applications, and speech recognition.

17. The method of claim 1, wherein the user device is a mobile computing device.

18. The method of claim 14, wherein said attempting to authenticate includes:
capturing device-information of the user device;
transmitting said captured device-information to said behaviometric-server;
storing the device-information in the behaviometric server as data related to said at least some behavioral data; and
in a subsequent authentication stage, following an initial rejection of the user identity, selecting said at least some behavioral data dependent on said device-information.

19. The method of claim 1, further comprising, if said attempting to authenticate fails multiple times, prohibiting the transaction requested by the user.

\* \* \* \* \*